United States Patent
Yamamoto et al.

(10) Patent No.: US 11,706,171 B2
(45) Date of Patent: Jul. 18, 2023

(54) INFORMATION PROCESSING DEVICE AND NON-TRANSITORY COMPUTER READABLE MEDIUM FOR UPDATING ELECTRONIC DOCUMENT POSTED IN THREAD OF ELECTRONIC CHAT CONFERENCE

(71) Applicant: FUJIFILM Business Innovation Corp., Tokyo (JP)

(72) Inventors: Takuma Yamamoto, Kanagawa (JP); Kohei Kaibara, Kanagawa (JP); Toru Takahashi, Kanagawa (JP); Masakazu Ketsuka, Kanagawa (JP); Mitsuru Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/078,097

(22) Filed: Dec. 9, 2022

(65) Prior Publication Data

US 2023/0105788 A1    Apr. 6, 2023

Related U.S. Application Data

(62) Division of application No. 17/539,163, filed on Nov. 30, 2021, now Pat. No. 11,558,323.

(30) Foreign Application Priority Data

Aug. 17, 2021 (JP) ................................. 2021-132566

(51) Int. Cl.
*H04L 51/08* (2022.01)
*H04L 51/046* (2022.01)
*H04L 51/216* (2022.01)
*H04L 51/18* (2022.01)

(52) U.S. Cl.
CPC ............ *H04L 51/08* (2013.01); *H04L 51/046* (2013.01); *H04L 51/18* (2013.01); *H04L 51/216* (2022.05)

(58) Field of Classification Search
CPC ..... H04L 51/08; H04L 51/216; H04L 51/046; H04L 51/18
See application file for complete search history.

(56) References Cited

U.S. PATENT DOCUMENTS

| | | | |
|---|---|---|---|
| 8,653,349 B1* | 2/2014 | White | G10H 1/0025 84/625 |
| 10,007,893 B2* | 6/2018 | Emmerson | G10H 1/0025 |
| 10,530,717 B2* | 1/2020 | Arisada | H04L 51/046 |
| 10,685,069 B2* | 6/2020 | Hodgins | H04L 51/216 |
| 2010/0146405 A1* | 6/2010 | Uoi | G10H 1/0025 715/756 |
| 2015/0288728 A1* | 10/2015 | Yagiura | H04L 67/1095 715/753 |

* cited by examiner

*Primary Examiner* — Sargon N Nano
(74) *Attorney, Agent, or Firm* — JCIPRNET

(57) ABSTRACT

An information processing device includes a processor configured to: perform a control for displaying on an operation screen a candidate for a thread on a service screen for a message exchange service in which information for accessing an electronic document generated by scanning a document is displayed in such a manner that a thread is able to be selected; and receive, on the operation screen, an operation for selecting a candidate for a thread and an operation for posting the electronic document into the message exchange service.

5 Claims, 14 Drawing Sheets

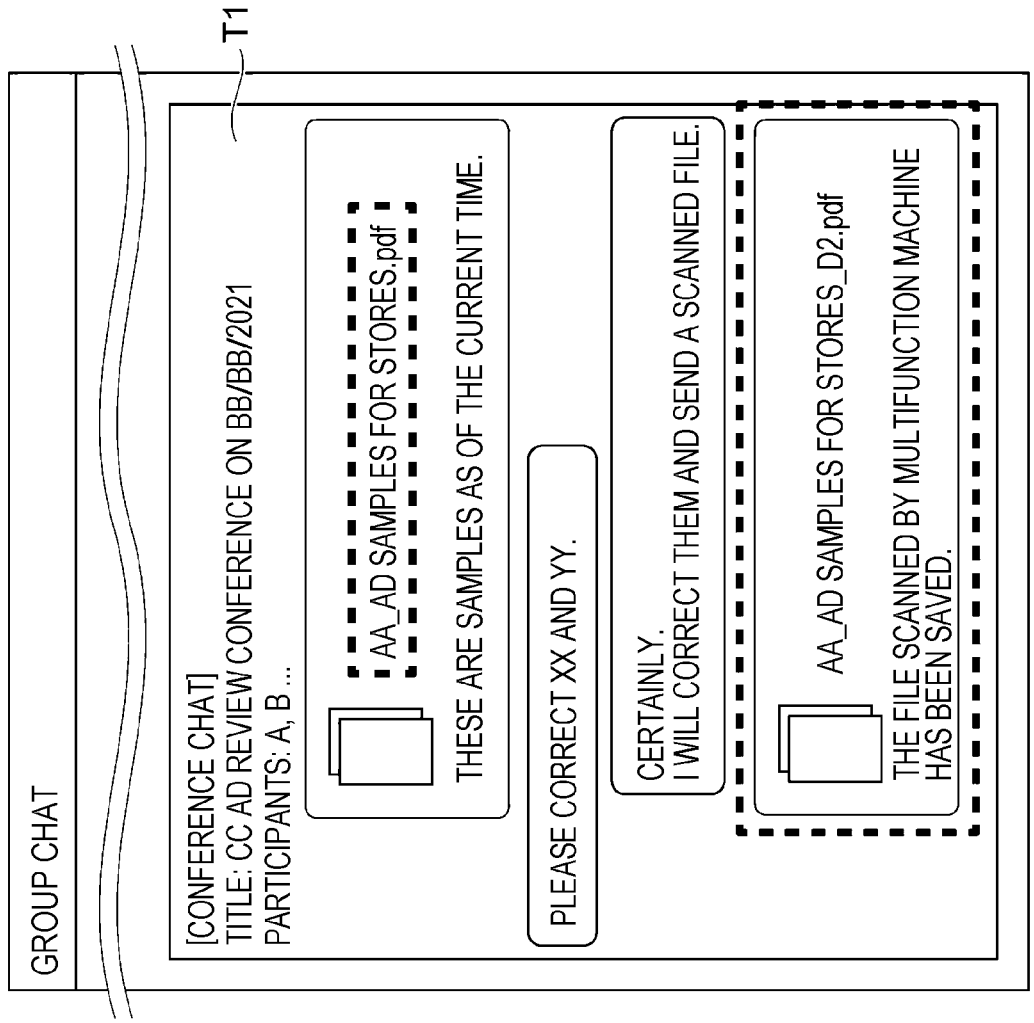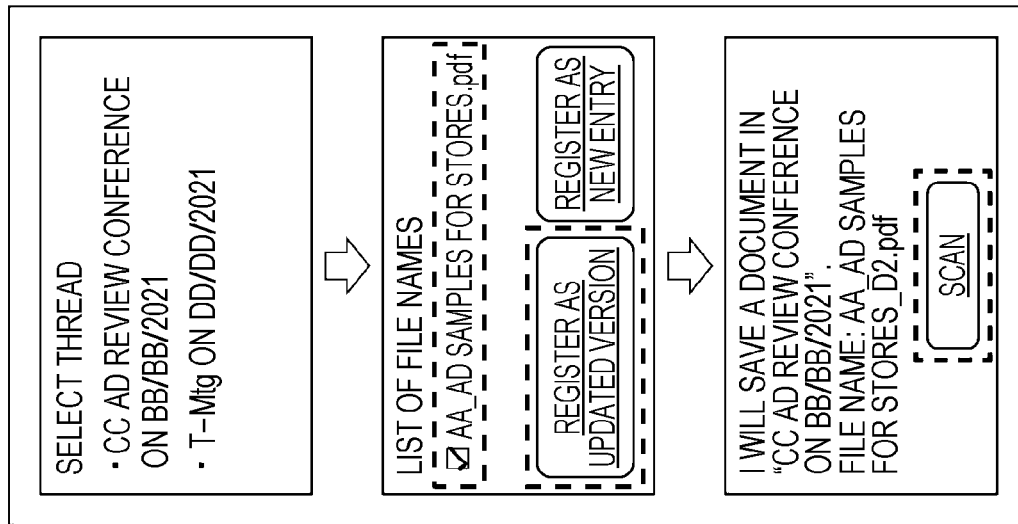

INFORMATION PROCESSING DEVICE AND NON-TRANSITORY COMPUTER READABLE MEDIUM FOR UPDATING ELECTRONIC DOCUMENT POSTED IN THREAD OF ELECTRONIC CHAT CONFERENCE

CROSS-REFERENCE TO RELATED APPLICATIONS

This application is a divisional application of U.S. application Ser. No. 17/539,163 which is now pending and claims the priority under 35 USC 119 from Japanese Patent Application No. 2021-132566 filed Aug. 17, 2021. The above-described applications are incorporated by reference.

BACKGROUND

(i) Technical Field

The present disclosure relates to an information processing device and a non-transitory computer readable medium for updating an electronic document posted in a thread of an electronic chat conference.

(ii) Related Art

There have been systems for posting electronic documents on a service screen for sharing messages between members in a place to exchange information using a message exchange service, for example, in a chat conference that members of a group take part in. In Japanese Unexamined Patent Application Publication No. 2020-47000, an information processing system is disclosed. The information processing system controls interactions of a bot, which is an avatar of printing equipment, such that the bot progresses review of an electronic document posted in a group through interactions with a member of a group sharing messages on a service screen for a message exchange service, and instructs the printing equipment to print an electronic document for which approval of the reviewing is gained through interactions between the member of the group and the bot.

SUMMARY

In the message exchange service mentioned above, it may be difficult to identify which message, out of a plurality of messages shared on the service screen, the electronic document posted on the service screen corresponds to.

Aspects of non-limiting embodiments of the present disclosure relate to being able to identify which message, out of a plurality of messages shared on a service screen for a message exchange service, an electronic document posted on the service screen corresponds to.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to: perform a control for displaying on an operation screen a candidate for a thread on a service screen for a message exchange service in which information for accessing an electronic document generated by scanning a document is displayed in such a manner that a thread is able to be selected; and receive, on the operation screen, an operation for selecting a candidate for a thread and an operation for posting the electronic document into the message exchange service.

BRIEF DESCRIPTION OF THE DRAWINGS

Exemplary embodiments of the present disclosure will be described in detail based on the following figures, wherein:

FIG. 14A is a diagram illustrating a specific example of an operation screen displayed on the display unit of the image reading device in the case where an operation for updating an electronic document posted in a group chat is performed for the image reading device; and FIG. 14B is a diagram illustrating a specific example of a screen for a group chat displayed on the display unit of the client terminal.

DETAILED DESCRIPTION

Exemplary embodiments of the present disclosure will be described in detail below with reference to attached drawings.

<Configuration of Information Processing System>

Figure 1:
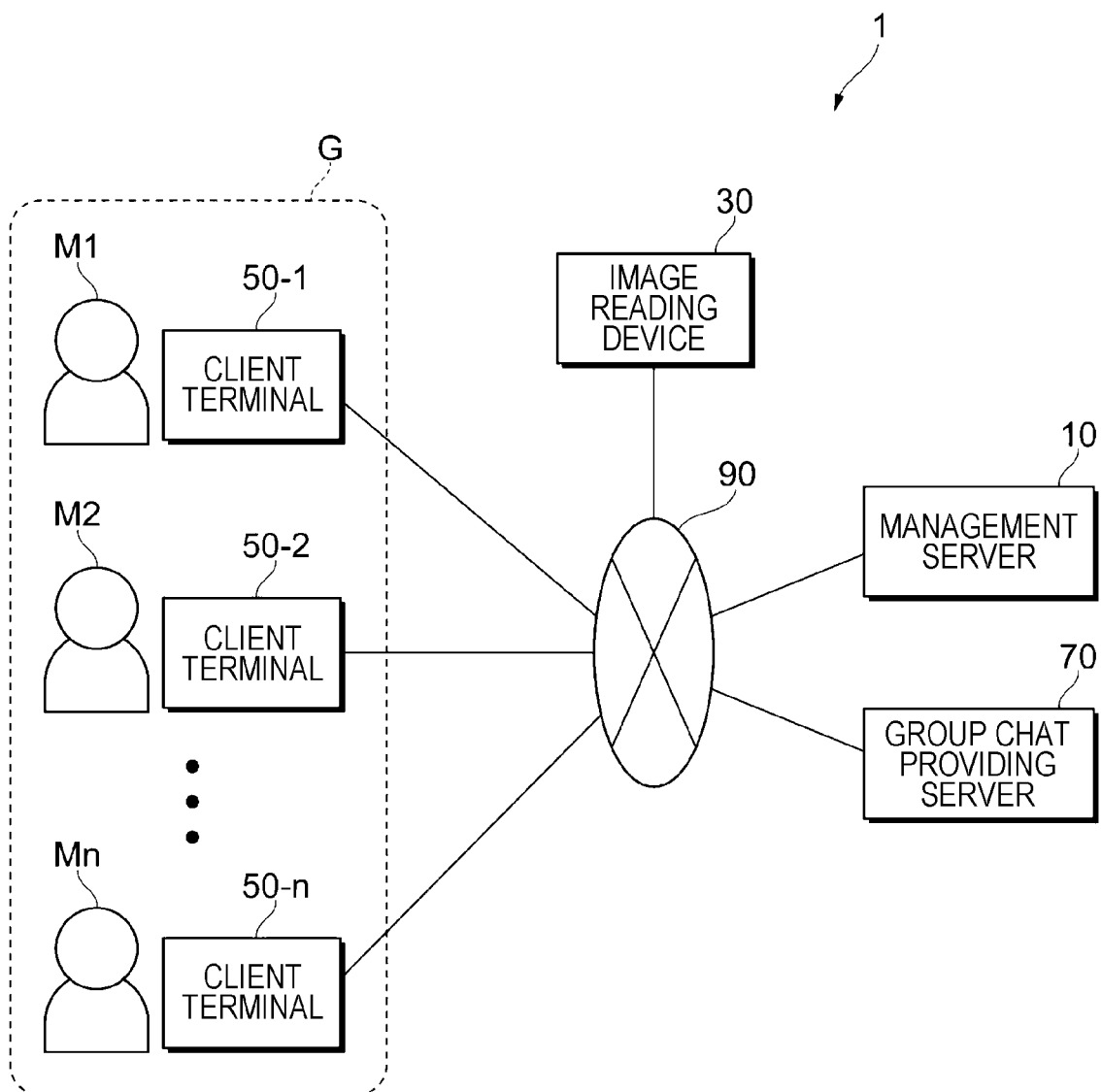
FIG. 1 is a diagram illustrating the entire configuration of an information processing system according to an exemplary embodiment.

FIG. 1 is a diagram illustrating the entire configuration of an information processing system 1 according to an exemplary embodiment.

The information processing system 1 includes a management server 10, an image reading device 30, client terminals 50-1 to 50-*n* (n represents an integer of two or more), and a group chat providing server 70 that are connected via a network 90. In FIG. 1, only one image reading device 30 and only one group chat providing server 70 are illustrated. However, a plurality of image reading devices 30 and a plurality of group chat providing servers 70 may be connected to the network 90. The network 90 is, for example, a local area network (LAN) or the Internet.

The management server 10 is an information processing device serving as a server that manages the entire information processing system 1. For example, the management server 10 performs control for displaying information for accessing an electronic document posted in a message exchange service enabling messages to be shared between members at a position specified in advance in a thread of the message exchange service. In this exemplary embodiment, the message exchange service is a group chat. An electronic document posted in the group chat is content on an electronic medium. Electronic documents are, for example, document files or image (still or moving image) files stored in advance in the client terminals 50-1 to 50-*n*, document files or image files generated by reading, using the image reading device 30, documents recorded on a recording medium such as paper, or the like.

The image reading device 30 is an information processing device that generates an electronic document by reading a document recorded on a recording medium such as paper and posts the generated electronic document into a group chat. For example, candidates for threads in which information for accessing an electronic document will be displayed are displayed on a screen of the image reading device 30 in such a manner that a thread is able to be selected, and the image reading device 30 receives an input operation for selecting a thread. The image reading device 30 is, for example, a multifunction machine having a reading function or a scanner device.

The client terminals 50-1 to 50-*n* are information processing devices such as smartphones, personal computers, or tablet terminals used by members M1 to Mn composing a group G. The client terminals 50-1 to 50-*n* display a service screen for a group chat used by the members M1 to Mn, respectively. Hereinafter, in the case where there is no need to distinguish among the client terminals 50-1 to 50-*n* and distinguish among the members M1 to Mn, the client terminals 50-1 to 50-*n* and the members M1 to Mn will be referred to as client terminals 50 and members M, respectively.

The group chat providing server 70 is an information processing device serving as a server that provides a group chat to a member M. A person who manages the group chat providing server 70 may be the same as a person who manages the management server 10 or different from a person who manages the management server 10.

<Hardware Configuration of Management Server>

Figure 2:
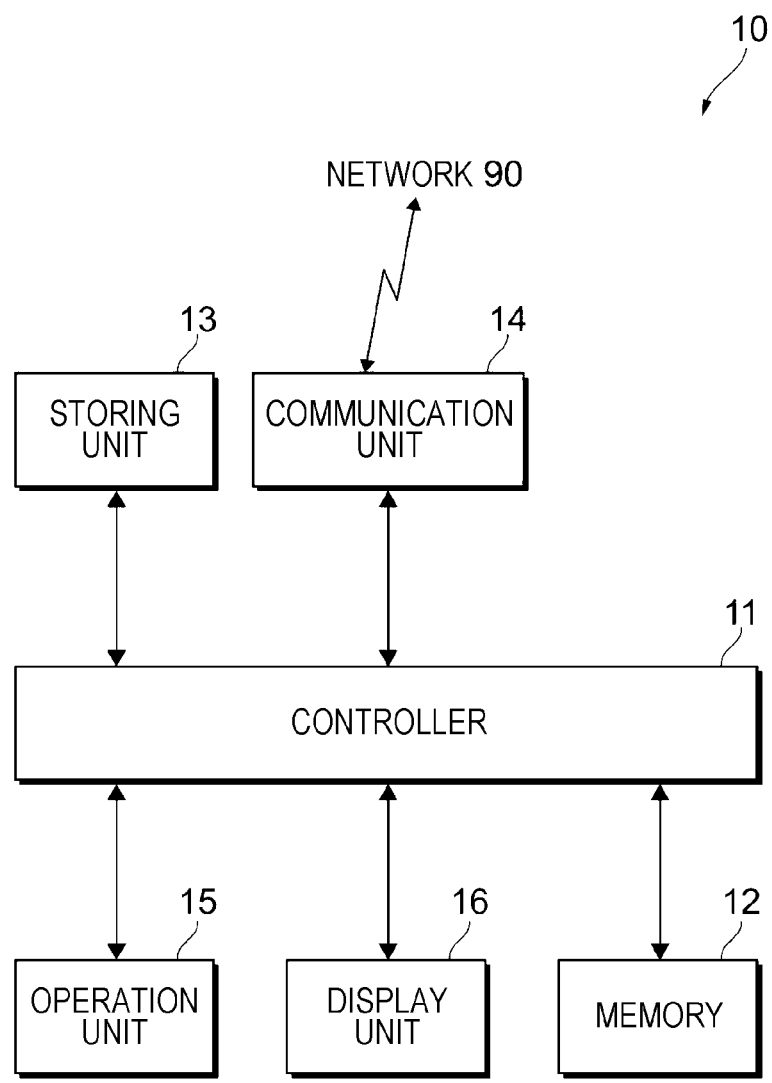
FIG. 2 is a diagram illustrating a hardware configuration of a management server.

FIG. 2 is a diagram illustrating a hardware configuration of the management server 10.

The management server 10 includes a controller 11, a memory 12, a storing unit 13, a communication unit 14, an operation unit 15, and a display unit 16. These units are connected by a data bus, an address bus, a peripheral component interconnect (PCI) bus, or the like.

The controller 11 is a processor that controls the operation of the management server 10 by executing various types of software such as operating software (OS) and application software. The controller 11 includes, for example, a central processing unit (CPU). The memory 12 is a storage region that stores various types of software, data to be used for the various types of software, and the like and is used as a work area for arithmetic operations. The memory 12 includes, for example, a random access memory (RAM).

The storing unit 13 is a storage region in which input data to be input to various types of software, output data output from the various types of software, and the like are stored. The storing unit 13 includes, for example, a hard disk drive (HDD), a solid state drive (SSD), a semiconductor memory, or the like used for storing a program, various setting data, and the like. The communication unit 14 transmits and receives data via the network 90. For example, the communication unit 14 transmits and receives data to and from the image reading device 30, the client terminals 50, and the group chat providing server 70.

The operation unit 15 includes, for example, a keyboard, a mouse, a machine button, and a switch and receives input operations. The operation unit 15 also includes a touch sensor integrated with the display unit 16 to configure a touch panel. The display unit 16 displays images, text information, and the like. The display unit 16 includes, for example, a liquid crystal display or an organic electroluminescence (EL) display used for displaying information.

<Hardware Configuration of Image Reading Device>

Figure 3:
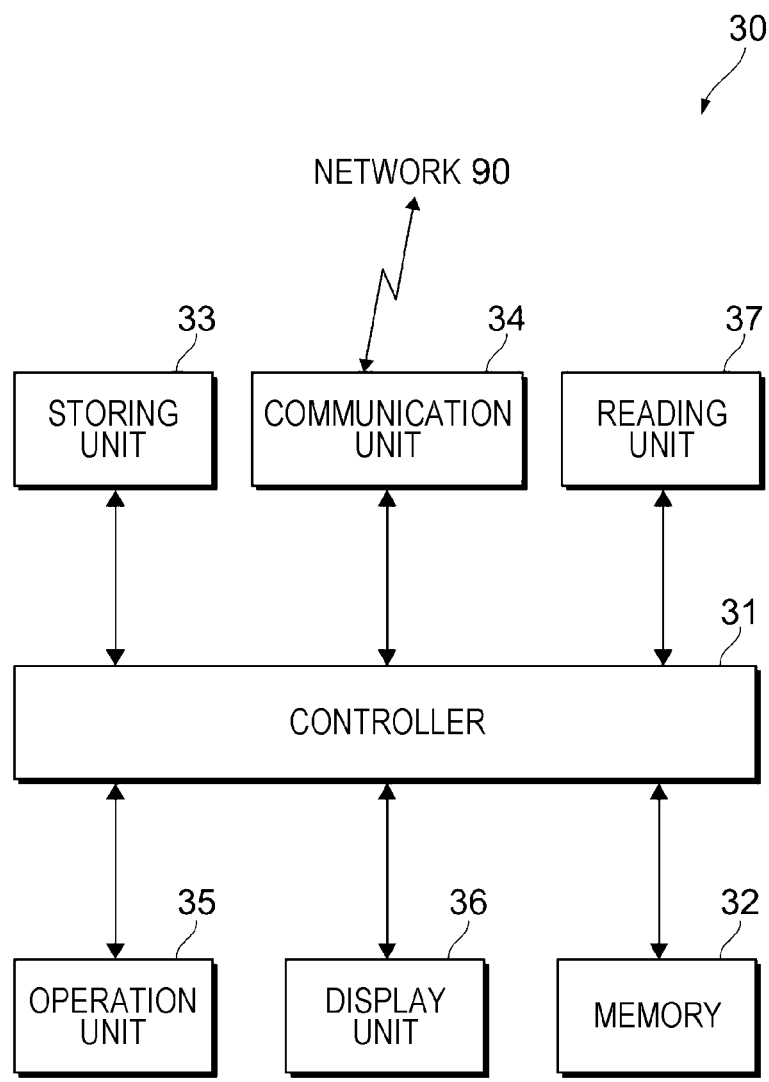
FIG. 3 is a diagram illustrating a hardware configuration of an image reading device.

FIG. 3 is a diagram illustrating a hardware configuration of the image reading device 30.

The image reading device 30 has a hardware configuration similar to the hardware configuration of the management server 10 illustrated in FIG. 2 except for a reading unit 37. That is, the image reading device 30 includes a controller 31 that includes a processor such as a CPU, a memory 32 that includes a storage region such as a RAM, and a storing unit 33 that includes a storage region such as an HDD, an SDD, or a semiconductor memory. The image reading device 30 also includes a communication unit 34 that transmits and receives data to and from the management server 10, the client terminals 50, and the like via the network 90. The image reading device 30 also includes an operation unit 35 that includes a keyboard, a mouse, a touch panel, and the like and a display unit 36 that includes a liquid crystal display, an organic EL display, or the like. These units are connected by a data bus, an address, bus, a PCI bus, or the like.

The reading unit 37 reads a document recorded on a recording medium such as paper. The reading unit 37 includes, for example, a charge coupled devices (CCD) scanner in which reflected light of light applied to an original from a light source is reduced by a lens and received at CCD devices, a contact image sensor (CIS) scanner in which reflected light of light applied sequentially to an original from a light-emitting diode (LED) light source is received at a CIS sensor, or the like.

<Hardware Configuration of Client Terminal and Group Chat Providing Server>

The hardware configuration of the client terminals 50 and the group chat providing server 70 is similar to the hardware configuration of the management server 10 illustrated in FIG. 2. Thus, illustration and description of the hardware configuration of the client terminals 50 and the group chat providing server 70 will be omitted.

<Functional Configuration of Management Server>

Figure 4:
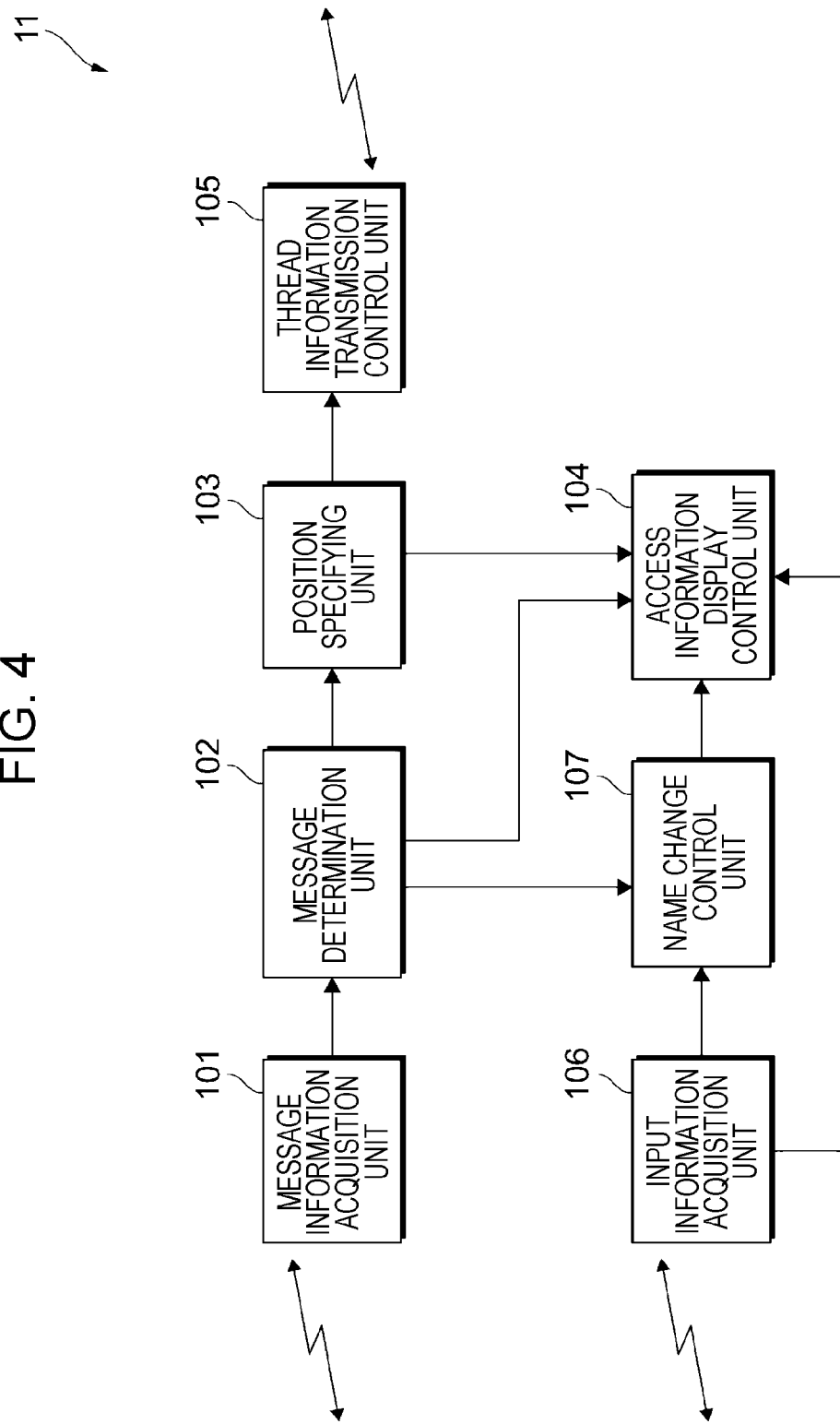
FIG. 4 is a diagram illustrating a functional configuration of the management server.

FIG. 4 is a diagram illustrating a functional configuration of the management server 10.

The controller 11 of the management server 10 includes a message information acquisition unit 101, a message determination unit 102, a position specifying unit 103, an access information display control unit 104, a thread information transmission control unit 105, an input information acquisition unit 106, and a name change control unit 107.

The message information acquisition unit 101 acquires information regarding messages posted in a group chat provided by the group chat providing server 70. The acquired information regarding messages includes, for each of one or more messages posted in the group chat, information regarding a wording of the message and information regarding the position of the message displayed in a thread on the service screen for the group chat.

The message determination unit 102 determines, on the basis of information regarding wordings of messages extracted from information regarding the messages, whether or not a message containing a predetermined wording is present in the messages posted in a group chat. The predetermined wording represents a wording indicating that information for accessing an electronic document that will be posted in a group chat is to be displayed at the position of the message. The predetermined wording is, for example, a wording such as "#The document will be saved here #". In this exemplary embodiment, the predetermined wording will be referred to as a marking comment.

The message determination unit 102 determines, on the basis of information regarding wordings of messages, whether or not a message containing a wording for specifying an electronic document posted in a group chat is present in the messages posted in the group chat. In this exemplary embodiment, a wording for specifying an electronic document posted in a group chat is the file name of an electronic document posted in a group chat.

In the case where it is determined by the message determination unit 102 that a message containing a marking comment is present, the position specifying unit 103 specifies, on the basis of information regarding the position of the marking comment, a position at which information for accessing an electronic document that will be posted in a group chat is to be displayed. Specifically, the position specifying unit 103 specifies, as a position at which information for accessing an electronic document that will be posted in a group chat is to be displayed, the position in a thread at which the message containing the marking comment is displayed.

In the case where multiple messages containing a marking comment are present in the same thread, the position specifying unit 103 specifies a position at which information for accessing an electronic document that will be posted in a group chat is to be displayed, on the basis of times at which the messages containing a marking comment were posted. For example, the position specifying unit 103 specifies, as a position at which information for accessing an electronic document that will be posted in a group chat is to be displayed, the position in a thread at which the earliest posted message, out of multiple messages containing a marking comment, is displayed.

The access information display control unit 104 performs, when posting of an electronic document into a group chat is done, control for displaying information for accessing the electronic document at a position of a message in a thread specified by the position specifying unit 103. "Posting of an electronic document into a group chat" represents posting of a message to which an electronic document is attached into a group chat. Furthermore, "information for accessing the electronic document" represents, for example, information for opening an electronic document by a click or tap operation, information for downloading an electronic document, or the like. Furthermore, "control for displaying at a position specified in a thread" represents performing processing and a procedure necessary for displaying information for accessing an electronic document at a position of a message specified in a thread. For example, providing an electronic document that will be posted or information for accessing an electronic document that will be posted to the group chat providing server 70 and causing the information for accessing the electronic document to be displayed at the position of a marking comment is an example of "control for displaying at a position specified in a thread".

The access information display control unit 104 performs, when an electronic document is posted in a group chat, control such that information for accessing the posted electronic document replaces a marking comment and is displayed. Accordingly, the marking comment is not displayed, and the information for accessing the electronic document is displayed at the position where the marking comment was displayed.

The thread information transmission control unit 105 performs control for transmitting information regarding a thread in a group chat to the image reading device 30. Information regarding a thread includes information for uniquely specifying a thread and information regarding a message containing a marking comment. Information regarding a thread transmitted to the image reading device 30 may be information regarding a thread in which a message containing a marking comment is posted or information regarding all the threads created in a group chat.

The input information acquisition unit 106 acquires input information from the image reading device 30. Input information represents information acquired when an input operation on the operation unit 35 of the image reading device 30 is received. An input operation is performed by a member M who posts an electronic document in a group chat.

The name change control unit 107 performs, on the basis of information regarding a wording of a message, control for changing the file name of an electronic document posted in a group chat. Specifically, in the case where a message containing a marking comment and a wording indicating the file name of an electronic document is present in messages posted in a group chat, the name change control unit 107 performs control for changing the file name of an electronic document that will be posted to include the wording. In the case where an electronic document is generated by a multifunction machine, a scanner device, or the like, it is difficult to understand the contents of the electronic document from a file name automatically provided to the electronic document at the time of generation of the electronic document. In addition, many people do not have much experience in specifying a file name by an input operation for a multifunction machine, a scanner device, or the like. Thus, in this exemplary embodiment, the name of an electronic document is included in a wording of a message to be posted in a group chat, so that the file name of the electronic document that will be posted is set in advance.

In the case where a request for posting of an updated version of an electronic document posted in a group chat is received, the name change control unit 107 changes the file name of the updated version of the electronic document to include a wording indicating that the electronic document is the updated version. Specifically, the name change control unit 107 adds a wording indicating that an electronic document is an updated version (for example, a wording indicating a version number) to the ending of the file name of the electronic document before updating.

<Functional Configuration of Image Reading Device>

Figure 5:
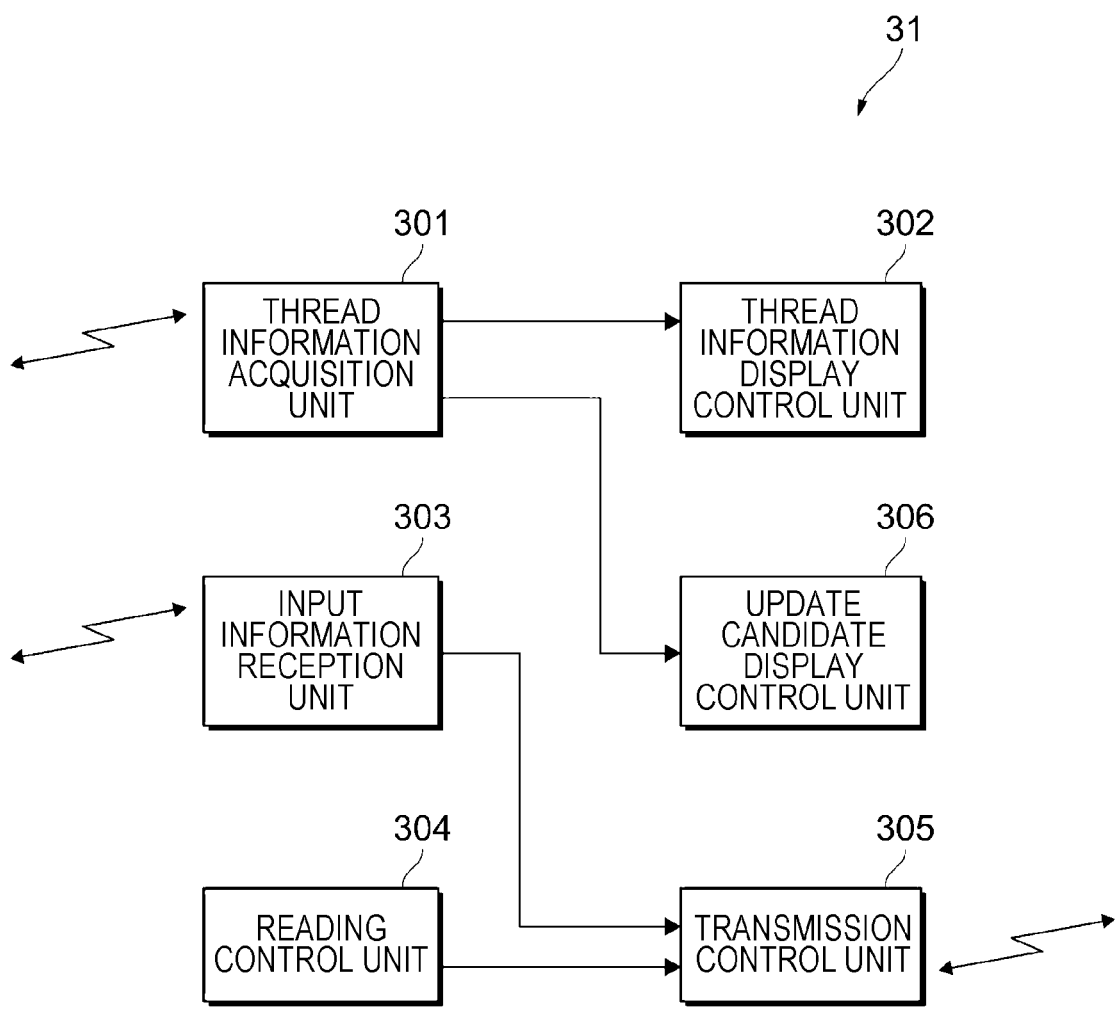
FIG. 5 is a diagram illustrating a functional configuration of the image reading device.

FIG. 5 is a diagram illustrating a functional configuration of the image reading device 30.

In the controller 31 of the image reading device 30, a thread information acquisition unit 301, a thread information display control unit 302, an input information reception unit 303, a reading control unit 304, a transmission control unit 305, and an update candidate display control unit 306 function.

The thread information acquisition unit 301 performs control for transmitting information regarding threads in a group chat transmitted from the management server 10. Information regarding threads transmitted from the management server 10 includes, as described above, information for uniquely identifying a thread and information regarding a message containing a marking comment. There is a case where information regarding a thread in which a message containing a marking comment is posted is transmitted and a case where information regarding all the threads created in a group chat is transmitted.

The thread information display control unit 302 performs control for displaying information regarding threads in a group chat acquired by the thread information acquisition unit 301 on the display unit 36. For example, the thread information display control unit 302 performs control for displaying on the display unit 36 of the image reading device 30 the list of candidates for threads in the group chat in which information for accessing an electronic document that will be posted in the group chat is displayed in such a manner that a thread is able to be selected. In this case, an electronic document that will be posted in a group chat is, for example, an electronic document generated as a result of an operation for scanning a document recorded on a recording medium such as paper and reading the document by the reading unit 37.

The thread information display control unit 302 performs control for displaying, as the list of candidates for an electronic document to be updated, the list of electronic documents posted in a group chat on the display unit 36 of the image reading device 30 in such a manner that an electronic document is able to be selected.

When an input operation for selecting any one of candidates for threads in which an electronic document will be posted from the list displayed on the display unit 36 of the image reading device 30 is performed on the operation unit 35, the input information reception unit 303 receives the input information. Furthermore, when an input operation for posting an electronic document into a group chat is performed on the operation unit 35, the input information reception unit 303 receives the input information.

When an input operation for selecting any one of candidates for an electronic document to be updated from the list displayed on the display unit 36 of the image reading device 30 is performed on the operation unit 35, the input information reception unit 303 receives the input information. Furthermore, when an input operation for requesting posting of an updated version of an electronic document selected to be updated is performed on the operation unit 35, the input information reception unit 303 receives the input information.

The reading control unit 304 performs controls of the reading unit 37 for reading a document recorded on a recording medium such as paper. When the reading control unit 304 performs reading control, a document read by the reading unit 37 is converted into an electronic document, and the electronic document is thus generated.

The transmission control unit 305 performs control for transmitting input information received by the input information reception unit 303 as input information to the management server 10. For example, the transmission control unit 305 performs control for transmitting, as input information, information of a thread selected as a thread in which an electronic document will be posted and information of an electronic document selected as an electronic document to be updated to the management server 10.

The update candidate display control unit 306 performs control for displaying, as the list of candidates for an electronic document to be updated, the list of electronic documents that have already been posted in a group chat on the display unit 36 of the image reading device 30.

<Process of Management Server and Image Reading Device>

Figure 6:
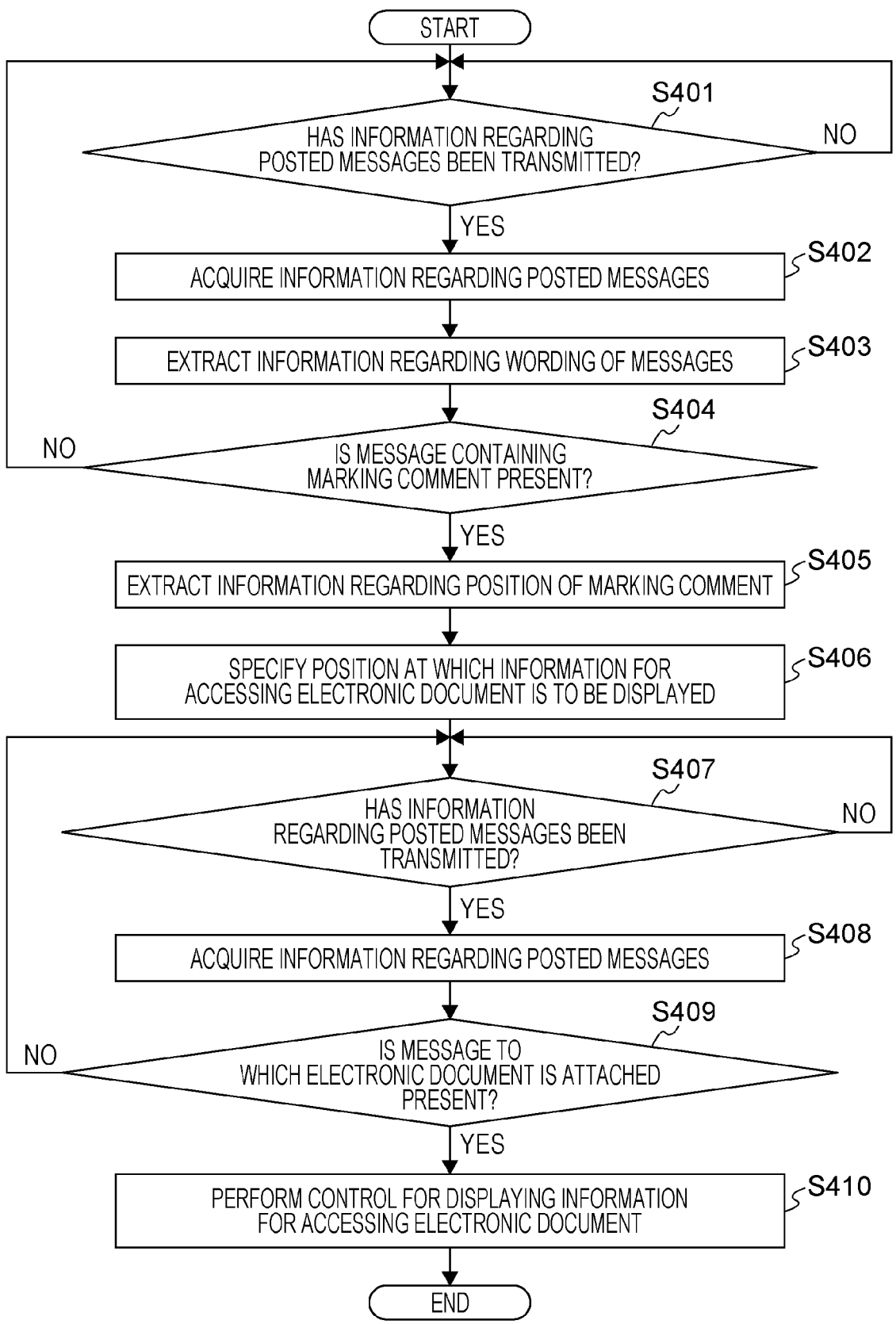
FIG. 6 is a flowchart illustrating a process performed by the management server in the case where an input operation for the image reading device is not performed.
Figure 7:
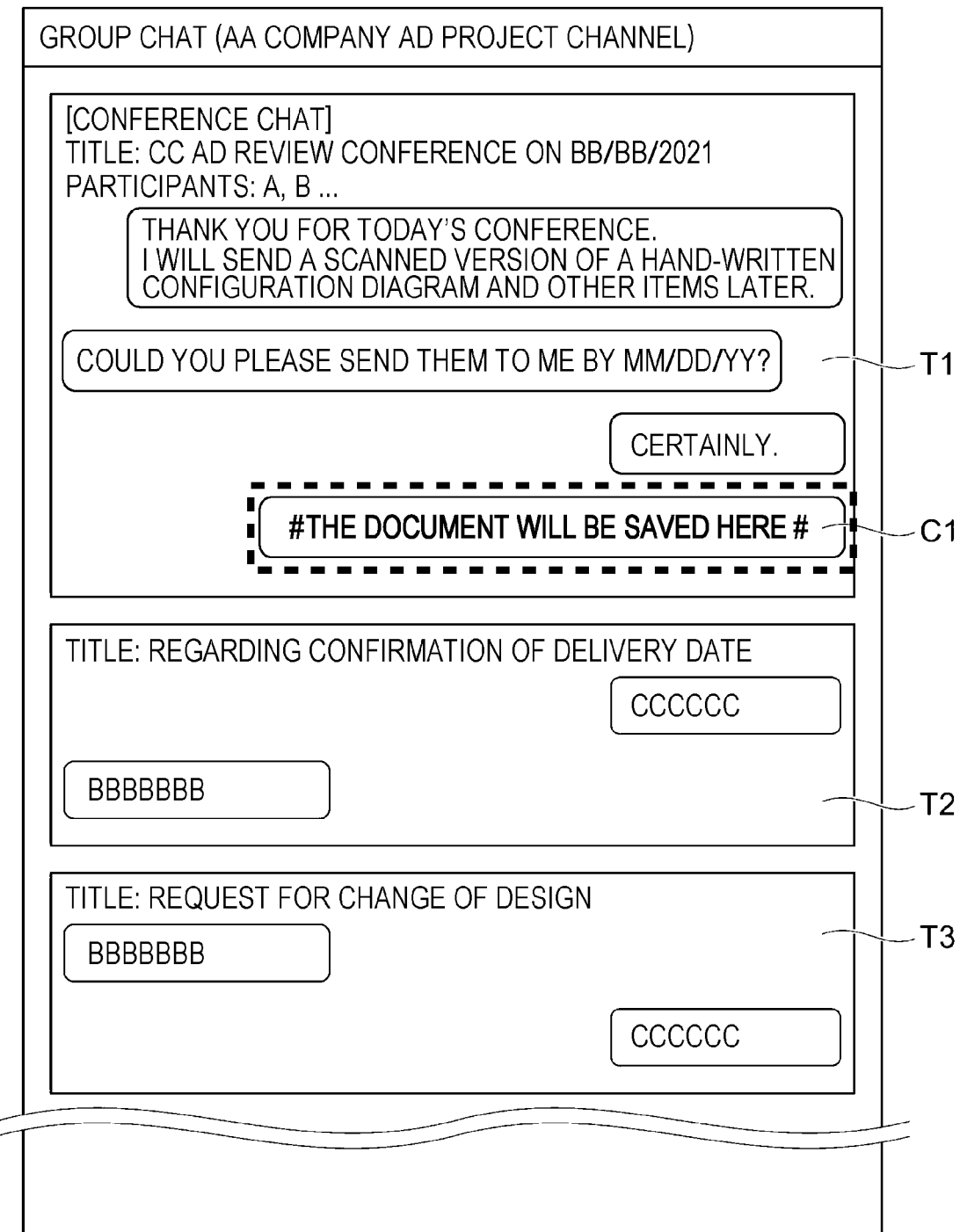
FIG. 7 is a diagram illustrating a specific example of a screen for a group chat displayed on a display unit of a client terminal.

FIG. 6 is a flowchart illustrating a process performed by the management server 10 in the case where an input operation for the image reading device 30 is not performed. FIG. 7 is a diagram illustrating a specific example of a screen for a group chat displayed on the display unit of the client terminal 50.

As illustrated in FIG. 6, when information regarding messages posted in a group chat is transmitted to the management server 10 (YES in step 401), the management server 10 acquires the information regarding the messages posted in the group chat (step 402). Then, the management server 10 extracts information regarding wordings of the messages from the information regarding the messages posted in the group chat (step 403). In contrast, in the case where information regarding messages posted in a group chat has not been transmitted to the management server 10 (NO in step 401), the management server 10 repeatedly performs the processing of step 401 until information regarding messages posted in a group chat is transmitted.

In the case where a message containing a marking comment is presented in the messages posted in the group chat (YES in step 404), the management server 10 extracts information regarding the position of the marking comment (step 405). Then, the management server 10 specifies the position of the marking comment as a position at which information for accessing an electronic document that will be posted in the group chat is to be displayed (step 406). In contrast, in the case where a message containing a marking comment is not present in the messages posted in the group chat (NO in step 404), the process returns to step 401.

FIG. 7 illustrates a specific example of a screen for a group chat. As illustrated in FIG. 7, a message containing a marking comment C1 is displayed in a region surrounded by a broken line of a thread T1 out of threads T1, T2, and T3 composing the group chat. In this case, the management server 10 specifies the position of the marking comment C1 as a position at which information for accessing an electronic document that will be posted in the group chat is to be displayed. In FIG. 7, an example of a group chat including the threads T1, T2, and T3 is illustrated as an example of a group chat in which a topic is managed in a thread. However, presence or absence of a thread and the number of threads are not particularly limited. For example, a group chat may include no thread or a group chat may include four or more threads.

Referring back to FIG. 6, when information regarding messages posted in the group chat is transmitted to the management server 10 (YES in step 407), the management server 10 acquires the information regarding the messages posted in the group chat (step 408). In contrast, in the case where information regarding messages posted in the group chat has not been transmitted to the management server 10 (NO in step 407), the management server 10 repeatedly performs the processing of step 407 until information regarding messages posted in the group chat is transmitted.

In the case where a message to which an electronic document is attached is present in the messages posted in the group chat (YES in step 409), the management server 10 performs control for displaying information for accessing the electronic document at the position specified in step 406 (for example, the position of the marking comment C1 in FIG. 7) (step 410). Then, the process ends. In contrast, in the case where a message to which an electronic document is attached is not present in the messages posted in the group chat (NO in step 409), the process returns to step 407.

In a typical group chat, messages are posted freely by the members M1 to Mn and are sequentially displayed in a thread according to the times of posting. Thus, for example, as in the example of FIG. 7, after messages of promising to post an electronic document, such as "I will send a scanned version of a hand-written configuration diagram and other items later.", "Could you please send them to me by MM/DD/YYYY?", and "Certainly.", are exchanged, many messages may be sequentially displayed in a stream. In this case, in known group chats, a message that has already been posted and an electronic document that is posted later are not able to be associated with each other. Thus, even if messages of promising to post an electronic document are exchanged in a group chat and the electronic document is posted later, it is not possible to immediately identify which message the electronic document is associated with. Hence, a lot of work such as searching for past messages displayed in a thread is required.

Thus, in this exemplary embodiment, a member M who exchanges messages of promising to post an electronic document in a group chat and will post the electronic document later posts a message containing a marking comment immediately after exchanging the messages. After that, once the electronic document is posted, the message containing the marking comment and the electronic document posted later are associated with each other. Then, information for accessing the posted electronic document is automatically displayed at the position of the marking comment.

Figure 8:
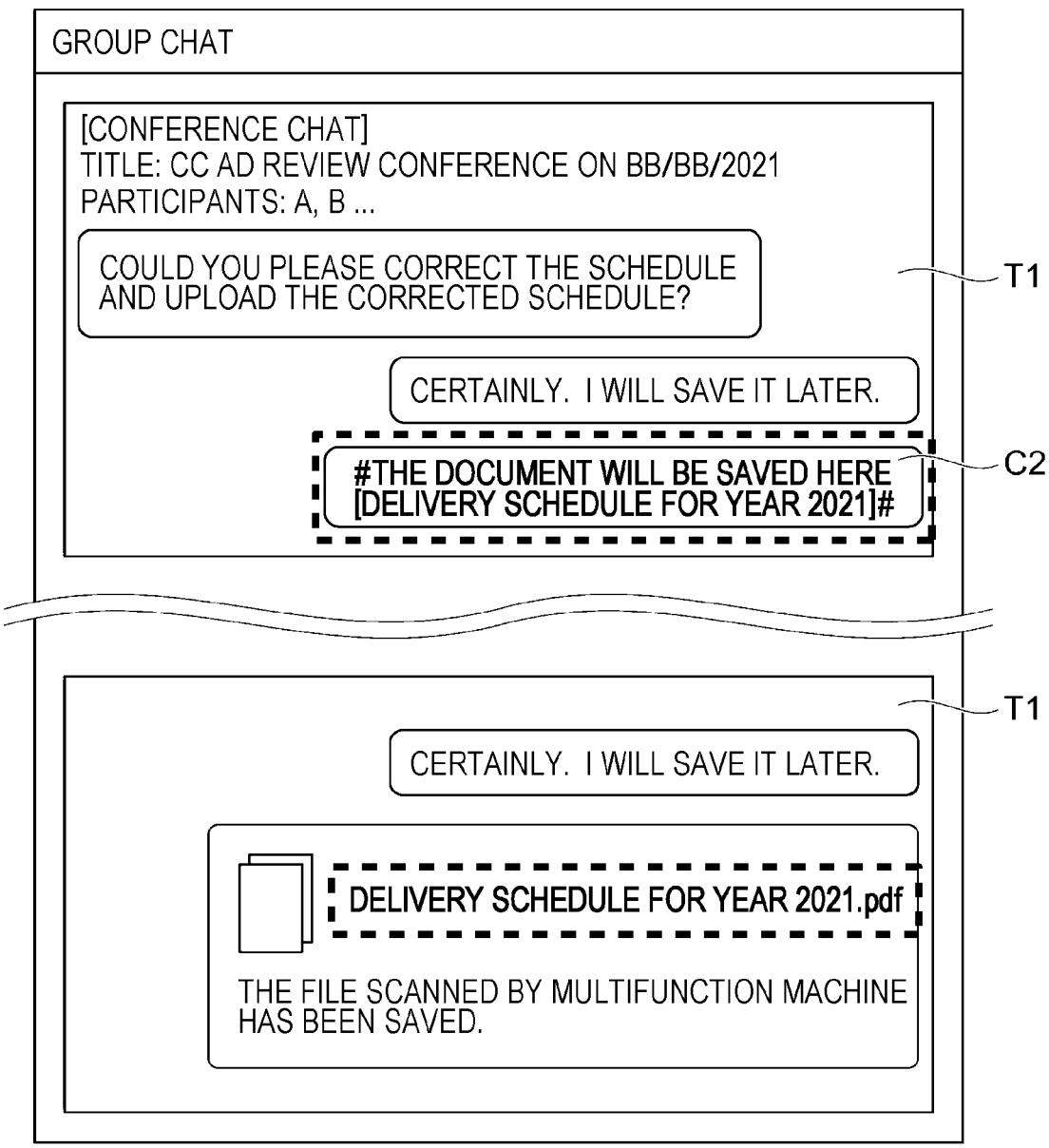
FIG. 8 is a diagram illustrating a specific example of a screen for a group chat displayed on the display unit of the client terminal.

FIG. 8 is a diagram illustrating a specific example of a screen for a group chat displayed on the display unit of the client terminal 50. As illustrated in FIG. 8, a message containing a marking comment C2 is displayed in a region surrounded by a broken line of the thread T1. In this case, the management server 10 specifies the position of the marking comment C2 as a position at which information for accessing an electronic document that will be posted in the group chat is to be displayed.

In the example of FIG. 8, the marking comment C2 is a wording "#The document will be saved here [delivery schedule for year 2021]#". The wording "delivery schedule for year 2021" out of wordings composing the marking comment C2 is set by an input operation by the member M when the message containing the marking comment C2 is posted, and the wording is used as a file name of an electronic document that will be posted later. Thus, when an electronic document with a certain file name is posted in the group chat, the original file name is automatically changed to the file name "delivery schedule for year 2021". As described above, information for accessing an electronic document replaces the marking comment C2 and is displayed at the position of the marking comment C2. Thus, the marking comment C2 is not displayed in the thread T1.

Figure 9:
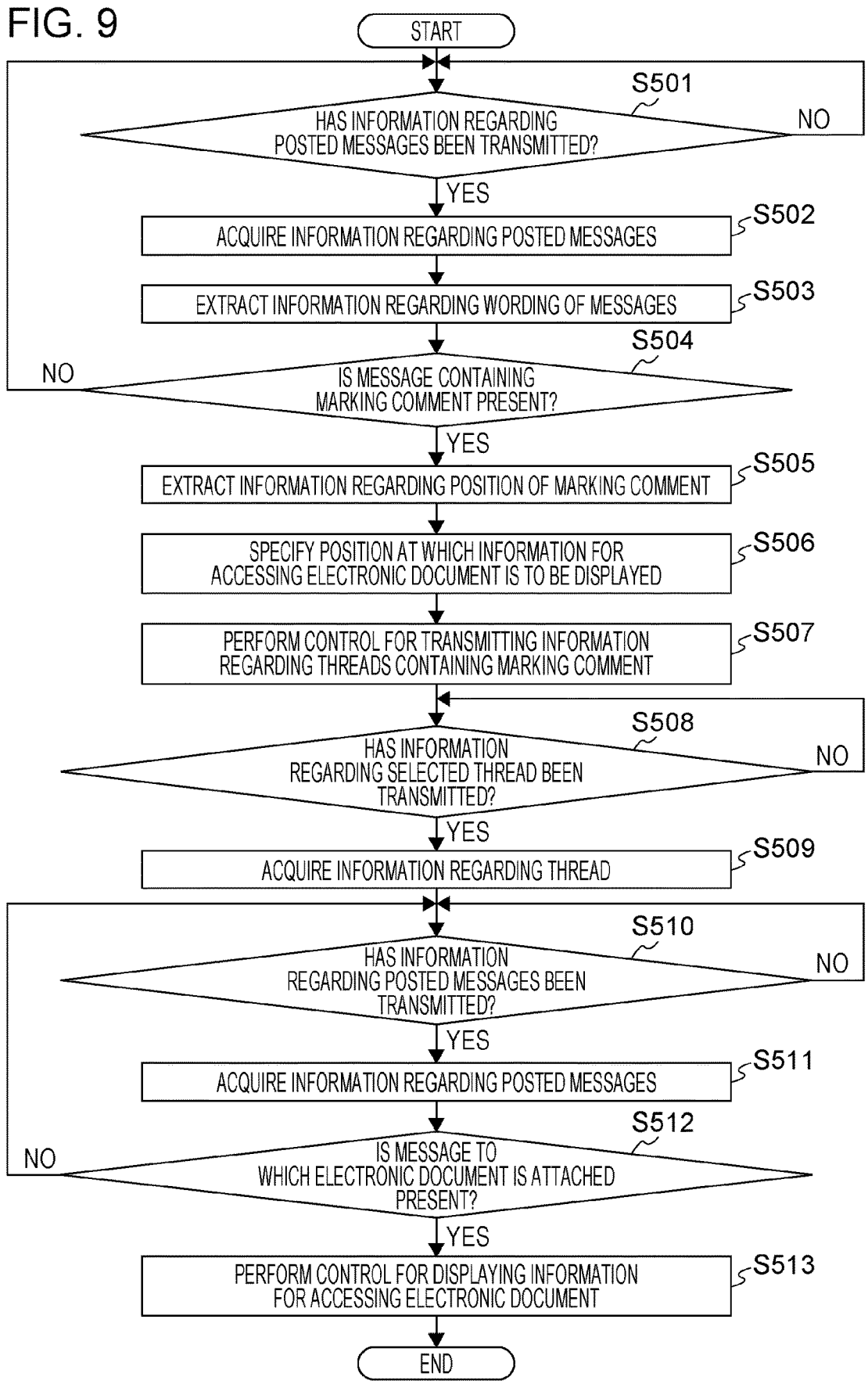
FIG. 9 is a flowchart illustrating a process performed by the management server in the case where an input operation for the image reading device is performed.

FIG. 9 is a flowchart illustrating a process performed by the management server 10 in the case where an input operation for the image reading device 30 is performed.

As illustrated in FIG. 9, when information regarding messages posted in a group chat is transmitted to the management server 10 (YES in step 501), the management server 10 acquires the information regarding the messages posted in the group chat (step 502). Then, the management server 10 extracts information regarding wordings of the messages from the information regarding the messages posted in the group chat (step 503). In contrast, in the case where information regarding messages posted in a group chat has not been transmitted to the management server 10 (NO in step 501), the management server 10 repeatedly performs the processing of step 501 until information regarding messages posted in a group chat is transmitted.

In the case where a message containing a marking comment is presented in the messages posted in the group chat (YES in step 504), the management server 10 extracts information regarding the position of the marking comment (step 505). Then, the management server 10 specifies the position of the marking comment as a position at which information for accessing an electronic document that will be posted in the group chat is to be displayed (step 506). In contrast, in the case where a message containing a marking comment is not present in the messages posted in the group chat (NO in step 504), the management server 10 returns to step 501.

The management server 10 performs control for transmitting information regarding threads containing a marking comment to the image reading device 30 (step 507). The list of candidates for threads in which information for accessing an electronic document that will be posted in a group chat is displayed on the display unit 36 of the image reading device 30 in such a manner that a thread is able to be selected. Application software for enabling collaboration with a group chat is installed in the image reading device 30, and the image reading device 30 and the group chat are managed using common authentication information. Thus, for example, an electronic document may be posted into a group chat from the image reading device 30. The image reading device 30 and the group chat may be able to be logged into using, for example, a common IC card.

When an input operation for selecting one of the threads in the list displayed on the display unit 36 is performed for the image reading device 30, the image reading device 30 transmits information regarding the selected thread to the management server 10. The information regarding the selected thread includes, for example, information of the contents of messages posted in the selected thread, the positions of the messages displayed in the selected thread, the position of a marking comment, and the like.

When information regarding the selected thread is transmitted to the management server 10 from the image reading device 30 (YES in step 508), the management server 10 acquires the information regarding the selected thread (step 509). In contrast, in the case where information regarding the selected thread has not been transmitted to the management server 10 from the image reading device 30 (NO in step 508), the management server 10 repeatedly performs the processing of step 508 until information regarding the selected thread is transmitted.

When information regarding messages posted in the group chat is transmitted to the management server 10 (YES in step 510), the management server 10 acquires information regarding the messages posted in the group chat (step 511). In contrast, in the case where information regarding messages posted in the group chat has not been transmitted to the management server 10 (NO in step 510), the management server 10 repeatedly performs the processing of step 510 until information regarding messages posted in the group chat is transmitted.

In the case where a message to which an electronic document is attached is presented in the posted messages (YES in step 512), the management server 10 performs control for displaying information for accessing the electronic document at the position of the marking comment (step 513). Then, the process ends. In contrast, in the case where a message to which an electronic document is attached is not present in the messages posted in the group chat (NO in step 512), the process returns to step 510. Control may be performed in such a manner that in a case where an electronic document is posted into a thread of a group chat, a member M is informed that the electronic document has been posted into the thread of the group chat.

Figure 10:
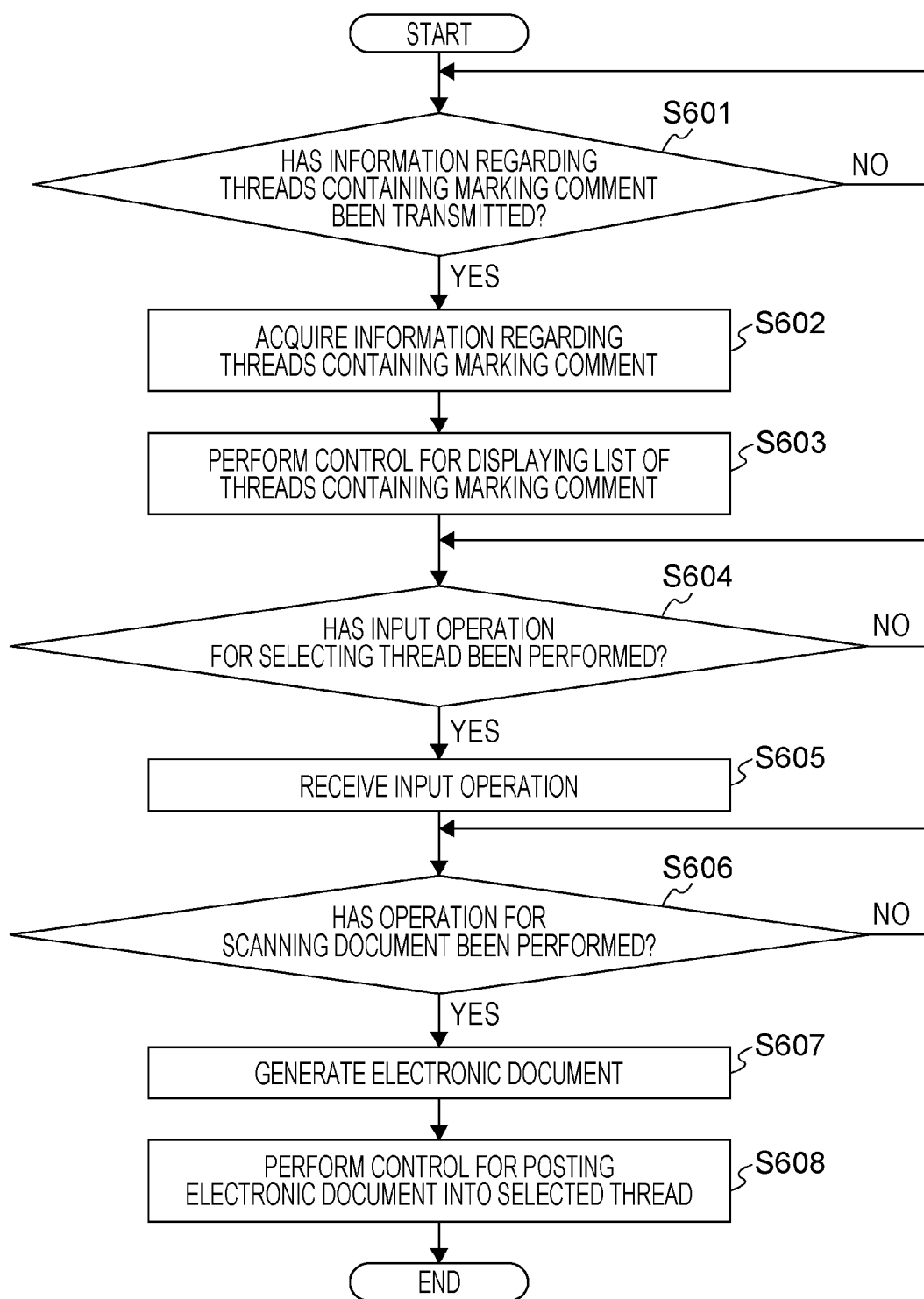
FIG. 10 is a flowchart illustrating a process performed by the image reading device in the case where an input operation for the image reading device is performed.

FIG. 10 is a flowchart illustrating a process performed by the image reading device 30 in the case where an input operation for the image reading device 30 is performed.

As illustrated in FIG. 10, when information regarding threads containing a marking comment is transmitted to the image reading device 30 from the management server 10 (YES in step 601), the image reading device 30 acquires the information regarding the threads containing a marking comment (step 602). Then, the image reading device 30 performs control for displaying the list of threads containing a marking comment on the display unit 36 (step 603). In contrast, in the case where information regarding threads containing a marking comment has not been transmitted to the image reading device 30 from the management server 10 (NO in step 601), the image reading device 30 repeatedly performs the processing of step 601 until information regarding threads containing a marking comment is transmitted.

When an input operation for selecting a thread in which the electronic document will be posted is performed on the operation unit 35 (YES in step 604), the image reading device 30 receives the input operation (step 605). Thus, the input information is received. In contrast, in the case where an input operation for selecting a thread has not been performed (NO in step 604), the image reading device 30 repeatedly performs the processing of step 604 until an input operation for selecting a thread is performed.

When an operation for scanning a document recorded on a recording medium such as paper is performed (YES in step 606), the image reading device 30 converts the read document into an electronic document, and the electronic document is thus generated (step 607). Then, the image reading device 30 performs control for posting the electronic document into the thread selected as a thread in which the electronic document will be posted (step S608). Then, the process ends. In contrast, in the case where an operation for scanning a document recorded on a recording medium such as paper has not been performed (NO in step 606), the image reading device 30 repeatedly performs the processing of step 606 until a scanning operation is performed.

Figure 11B:
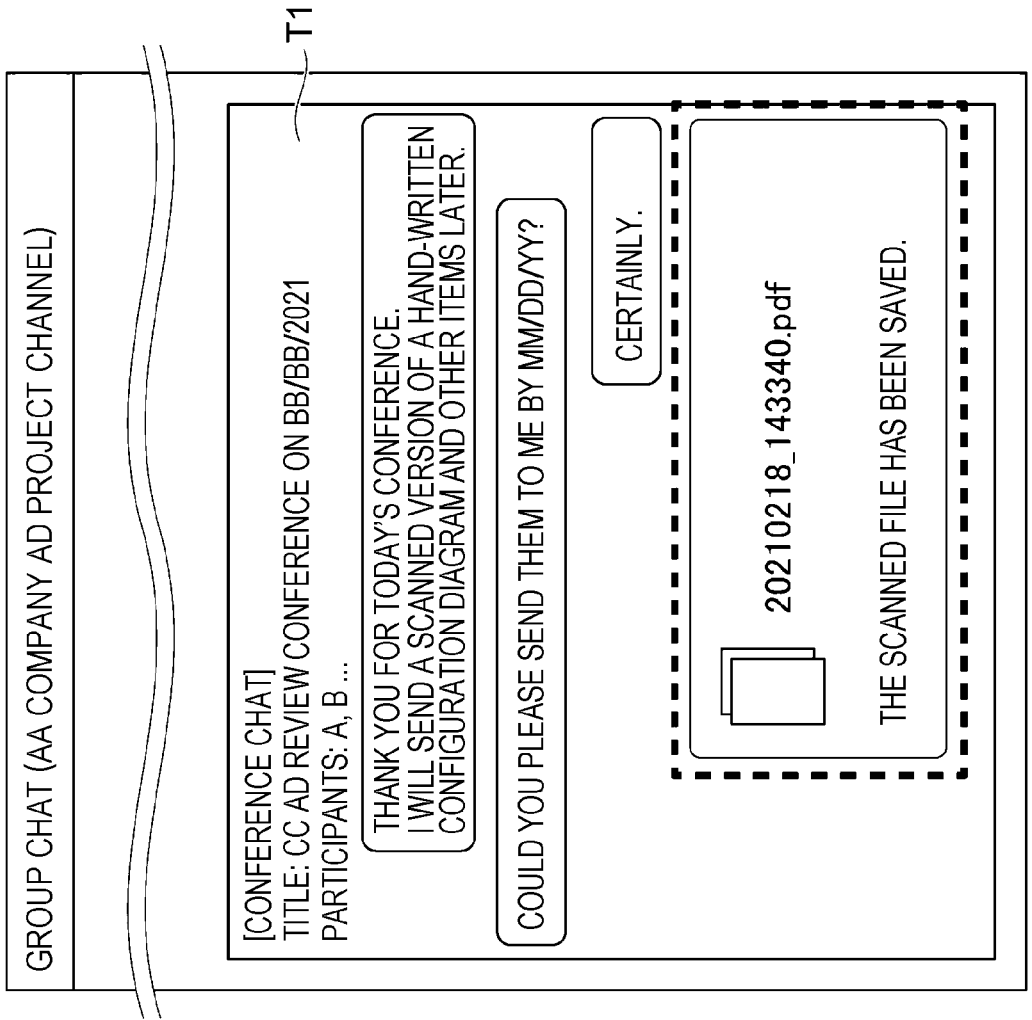
FIG. 11B is a diagram illustrating a specific example of a screen for a group chat displayed on the display unit of the client terminal.
Figure 11A:
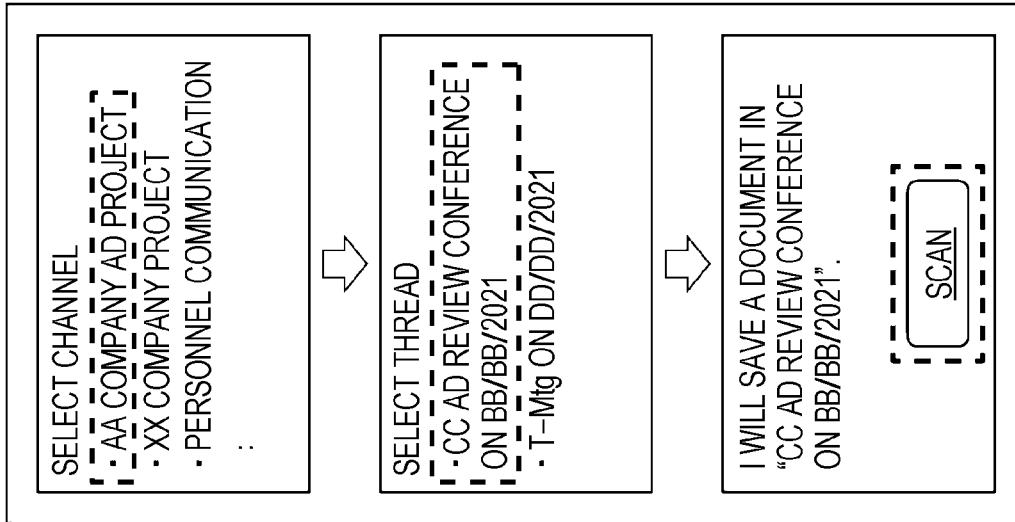
FIG. 11A is a diagram illustrating a specific example of an operation screen displayed on a display unit of the image reading device.

FIG. 11A is a diagram illustrating a specific example of an operation screen displayed on the display unit 36 of the image reading device 30. FIG. 11B is a diagram illustrating a specific example of a screen for a group chat displayed on the display unit of the client terminal 50.

As illustrated in a middle part of FIG. 11A, the list of threads containing a marking comment is displayed on the operation screen of the image reading device 30. For example, as illustrated in an upper part of FIG. 11A, in the case where there are multiple channels of group chat, the list of channels including a thread containing a marking comment is displayed in such a manner that a channel is able to be selected. When a channel is selected, transition to the operation screen illustrated in the middle part of FIG. 11A is made. On this operation screen, the list of threads containing a marking comment is displayed in such a manner that a thread is able to be selected. However, all the channels may be displayed. In this case, in the case where a selected channel does not include a thread containing a marking comment, a message indicating that the selected channel has no thread containing a marking comment may be displayed on the operation screen.

When an input operation for selecting a thread in which an electronic document will be posted is performed, for example, transition to an operation screen illustrated in a lower part of FIG. 11A is made. On this operation screen, a button (for example, a "scan" button) for performing an operation for scanning a document recorded on a recording medium is displayed. When this button is pressed and the operation for scanning a document recorded on a recording medium is performed, information for accessing a posted electronic document is displayed along with a message "The scanned file has been saved.", for example, as illustrated in a region surrounded by a broken line in FIG. 11B. In the example of FIG. 11B, an expression "20210218_143340.pdf" and an icon indicating an electronic document are displayed as information for accessing the posted electronic document. When the member M performs an operation for clicking or tapping the displayed information, access to the posted electronic document becomes enable.

Figure 12:
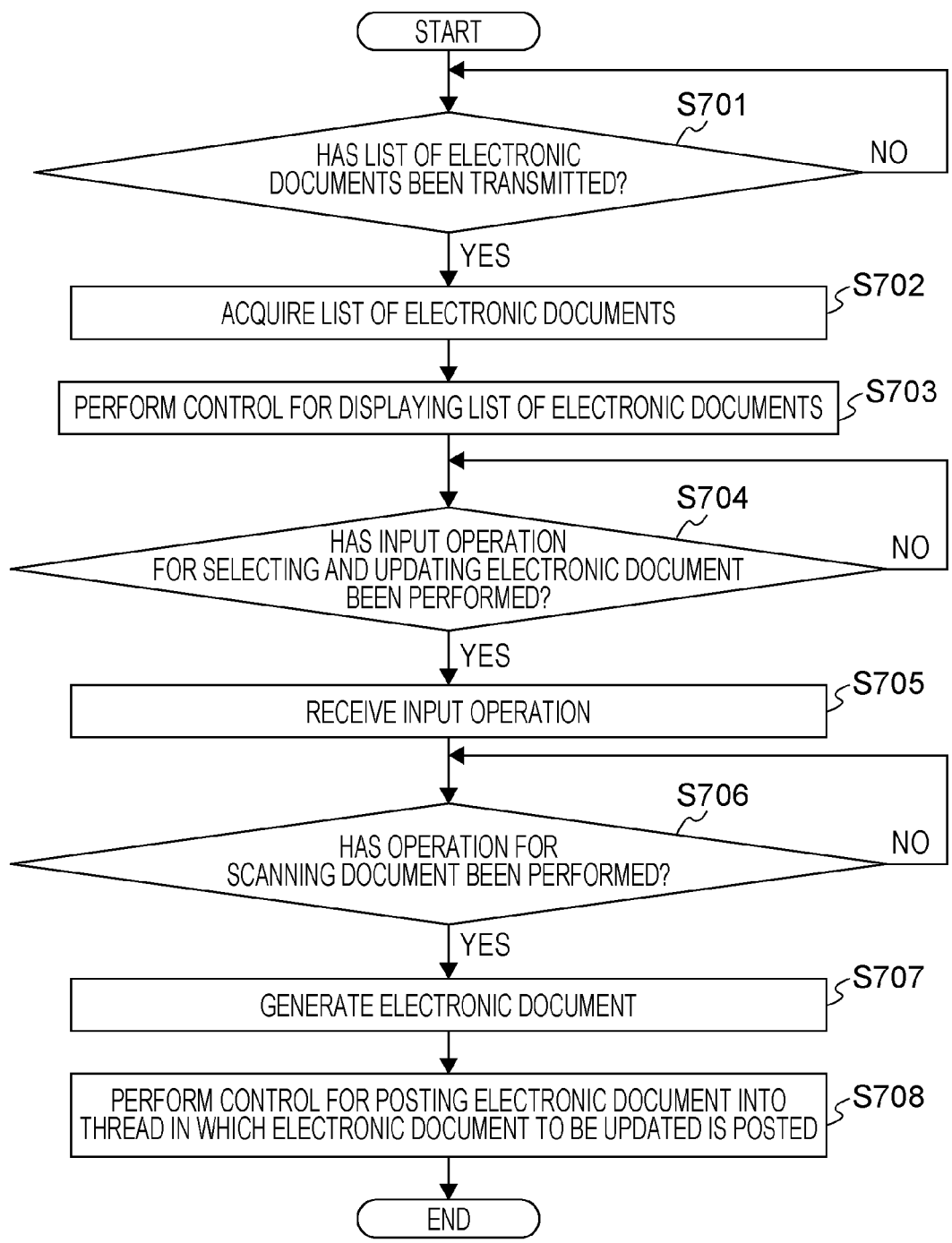
FIG. 12 is a flowchart illustrating a process performed by the image reading device in the case where a posted electronic document is updated.

FIG. 12 is a flowchart illustrating a process performed by the image reading device 30 in the case where a posted electronic document is updated.

As illustrated in FIG. 12, when the list of electronic documents posted in a group chat is transmitted to the image reading device 30 from the management server 10 (YES in step 701), the image reading device 30 acquires the list of electronic documents posted in the group chat (step 702). Then, the image reading device 30 performs control for displaying the list of electronic documents posted in the group chat as the list of candidates for an electronic document to be updated on the display unit 36 in such a manner that an electronic document is able to be selected (step 703). In contrast, in the case where the list of electronic documents posted in a group chat has not been transmitted to the image reading device 30 from the management server 10 (NO in step 701), the image reading device 30 repeatedly performs the processing of step 701 until the list of electronic documents posted in a group chat is transmitted.

When an input operation for selecting one of candidates for an electronic document to be updated in the list displayed on the display unit 36 of the image reading device 30 is performed on the operation unit 35 (YES in step 704), the image reading device 30 receives the input operation (step 705). Accordingly, the input information is received. In contrast, in the case where an input operation for selecting one of candidates for an electronic document to be updated has not been performed (NO in step 704), the image reading device 30 repeatedly performs the processing of step 704 until an input operation for selecting one of the candidates for an electronic document to be updated is performed.

When an operation for scanning a document recorded on a recording medium such a paper is performed (YES in step 706), the image reading device 30 converts the read document into an electronic document, and the electronic document is thus generated (step 707). Then, the image reading device 30 performs control for posting the electronic document into the thread in which the electronic document to be updated is posted (step 708). Then, the process ends. In contrast, in the case where an operation for scanning a document recorded on a recording medium such as paper has not been performed (NO in step 706), the image reading device 30 repeatedly performs the processing of step 706 until a scanning operation is performed.

Figure 13:
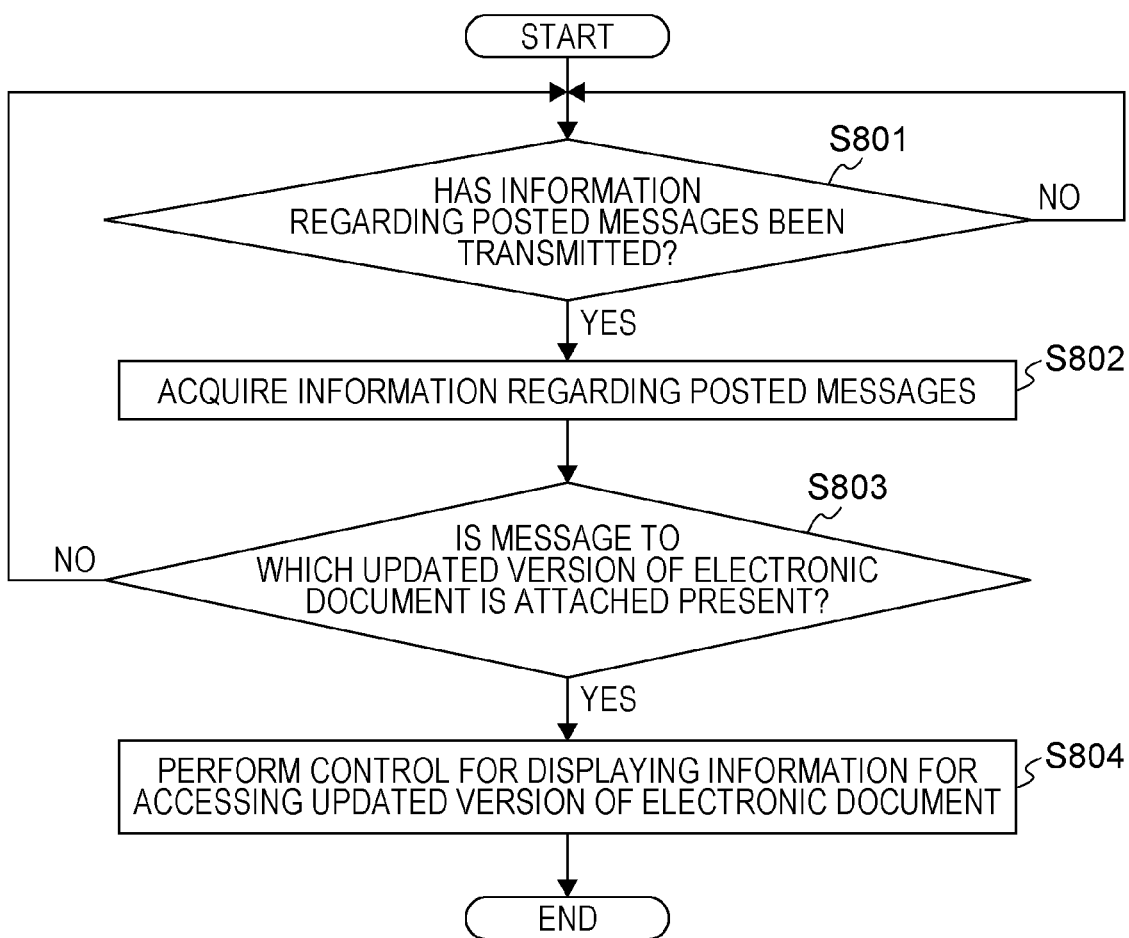
FIG. 13 is a flowchart illustrating a process performed by the management server in the case where an electronic document posted in a group chat is updated.

FIG. 13 is a flowchart illustrating a process performed by the management server 10 in the case where an electronic document posted in a group chat is updated.

As illustrated in FIG. 13, when information regarding messages posted in a group chat is transmitted to the management server 10 (YES in step 801), the management server 10 acquires the information regarding the messages posted in the group chat (step 802). In contrast, in the case where information regarding messages posted in a group chat has not been transmitted to the management server 10 (NO in step 801), the management server 10 repeatedly performs the processing of step 801 until information regarding messages posted in a group chat is transmitted.

In the case where a message to which the updated version of the electronic document is attached is present in the messages posted in the group chat (YES in step 803), the management server 10 performs control for displaying information for accessing the updated version of the electronic document (step 804). Then, the process ends. In contrast, in the case where a message to which the updated version of the electronic document is attached is not present in the messages posted in the group chat (NO in step 803), the process returns to step 801.

A message to which an updated version of an electronic document is attached may be posted into a group chat in a desired method. For example, the member M may post, using the client terminal 50, an electronic document stored in the client terminal 50 as an updated version of the electronic document. Furthermore, for example, the member M may perform, using the image reading device 30, an operation for scanning a document recorded on a recording medium such as paper and post an electronic document generated by scanning the document as an updated version of the electronic document.

FIG. 14A is a diagram illustrating a specific example of an operation screen displayed on the display unit 36 of the image reading device 30 in the case where an operation for updating an electronic document posted in a group chat is performed for the image reading device 30.

For example, the operation screen illustrated in FIG. 14A is displayed on the display unit 36 of the image reading device 30 so that the member M is able to post an updated version of an electronic document using the image reading device 30. As an example of an operation screen displayed on the display unit 36 of the image reading device 30, an operation screen displayed so that the member M is able to select a thread in which an electronic document to be updated is posted is illustrated in an upper part of FIG. 14. On this operation screen, the list of threads in which an electronic document is posted is displayed in such a manner that a thread is able to be selected. On this operation screen, all the threads, regardless of whether or not an electronic document is posted, may be displayed in such a manner that any one of the thread is able to be selected. In this case, in the case where no electronic document is posted in a selected thread, a message indicating that no electronic document is posted in the selected thread may be displayed on the operation screen.

When a thread in which an electronic document to be updated is posted is selected by an input operation on the operation screen illustrated in the upper part of FIG. 14A, transition to a screen illustrated in a middle part of FIG. 14A is made. On the screen illustrated in the middle part of FIG. 14A, the list of one or more electronic documents posted in the selected thread is displayed in such a manner that an electronic document is able to be selected as a candidate for an electronic document to be updated. In the middle part of FIG. 14A, the case where only one electronic document is displayed as a candidate for an electronic document to be updated is illustrated. However, in the case where multiple electronic documents are posted in the selected thread, the list of all the electronic documents posted in the thread is displayed.

When an electronic document to be updated is selected and a button "register as updated version" is pressed by an input operation on the operation screen illustrated in the middle part of FIG. 14A, transition to a screen illustrated in a lower part of FIG. 14A is made. On the screen illustrated in the lower part of FIG. 14A, a message indicating that an electronic document to be updated will be posted in the selected thread and a button "scan" are displayed.

In the message displayed on the screen illustrated in the lower part of FIG. 14A, the file name of an electronic document to be updated is described. The file name of the updated version of the electronic document is created by adding a wording clearly describing that the electronic document is an updated version to the ending of the file name of the electronic document before update. Specifically, for example, as illustrated in the middle part and the lower part of FIG. 14A, in the case where the file name of the electronic document before update is "AA_AD Samples for Stores", the file name of the updated version of the electronic document includes a wording "_D2" indicating a version number or a management number. The wording "_D2" is merely an example. For example, a wording such as "_Ver2" or "_2" may be added or a wording such as "_D3" or "_D4" associated with the number of times of updating may be added. When the button "scan" is pressed by an input operation by the member M, an operation for scanning a document recorded on a recording medium such as paper becomes enable.

FIG. 14B is a diagram illustrating a specific example of a screen for a group chat displayed on the display unit of the client terminal 50.

As illustrated in FIG. 14B, an electronic document before update and an updated version of the electronic document are posted in the thread T1. As described above, the file name of the updated version of the electronic document automatically includes a wording indicating that the electronic document is an updated version. Thus, after the electronic document with the file name "AA_AD Samples for Stores" is posted, the electronic document with the file name "AA_AD Samples for Stores_D2" is posted as an updated version. As described above, when the updated version of the electronic document is posted, an automatic change to the file name indicating that the electronic document is an updated version is made. Specifically, a change is made such that it is able to easily understand at first sight whether an electronic document posted in a group chat is the original version or an updated version or which version number the electronic document is.

The exemplary embodiment has been describe above. However, the present disclosure is not limited to the exemplary embodiment described above. Furthermore, advantages of the present disclosure are not limited to those described in the exemplary embodiment described above. For example, the system configuration illustrated in FIG. 1 and the hardware configurations illustrated in FIGS. 2 and 3 are merely examples for achieving an object of the present disclosure and are not particularly limited. Furthermore, the functional configurations illustrated in FIGS. 4 and 5 are merely examples and are not particularly limited. As long as functions that are capable of executing the entire processes described above are provided in the information processing system illustrated in FIG. 1, a functional configuration for implementing these functions is not limited to the examples of FIGS. 4 and 5.

Furthermore, the orders of steps in the processes illustrated in FIGS. 6, 9, 10, 12, and 13 are merely examples and are not particularly limited. The processes are not necessarily performed in chronological order in the orders of the steps illustrated in FIGS. 6, 9, 10, 12, and 13 and may be performed concurrently or separately. Furthermore, the operation screens illustrated in FIGS. 7, 8, 11, and 14 are merely examples and are not particularly limited. Any user interface that is able to receive the input operations described above may be used.

Furthermore, for example, in the exemplary embodiment described above, an input operation for selecting a thread in which an electronic document will be posted from the list of candidates for threads displayed on the operation screen of the image reading device 30 is performed. However, such an input operation is not necessarily performed. For example, a thread containing a marking comment may be automatically selected. In the case where there are multiple threads containing a marking comment, a thread containing the oldest posted marking comment may be automatically selected. In this case, as a method for the member M to confirm the result of automatic selection, for example, the member M may be informed of other threads posted before and after the automatically selected thread.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising: a processor configured to: perform a control for displaying on an operation screen a candidate for a thread on a service screen for a message exchange service in which information for accessing an electronic document generated by scanning a document is displayed in such a manner that a thread is able to be selected; and receive, on the operation screen, an operation for selecting a candidate for a thread and an operation for posting the electronic document into the message exchange service, wherein the processor is configured to receive the operation on the operation screen for requesting posting of the updated version of the electronic document posted in the message exchange service comprising: select a thread on the service screen, select a file from a list of file names, select, from a list of options, an option to post the updated version of the electronic document in the thread, and present a button to execute the posting of the updated version in a predetermined location of the thread.

2. The information processing device according to claim 1, wherein the processor is further configured to: receive an operation on the operation screen for requesting posting of an updated version of the electronic document posted in the message exchange service; and transmit, to a different information processing device that changes a name of the electronic document, information indicating that the updated version of the electronic document will be posted.

3. The information processing device according to claim 1, wherein the processor is further configured to: post, in the thread of the service screen, the updated version of the electronic document for which the name of the electronic document has been changed automatically.

4. The information processing device according to claim 1, wherein the processor is configured to change the name of the electronic document by preserving the name of a previous version of the electronic document and by adding a version name to a suffix of the name of the previous version of the electronic document.

5. A non-transitory storage medium storing a computer readable program to be loaded into a computer comprising a processor configured by the program to execute functions comprising: performing a control for displaying on an operation screen a candidate for a thread on a service screen for a message exchange service in which information for accessing an electronic document generated by scanning a document is displayed in such a manner that a thread is able to be selected; and receiving, on the operation screen, an operation for selecting a candidate for a thread and an operation for posting the electronic document into the message exchange service, wherein the processor is configured to receive the operation on the operation screen for requesting posting of the updated version of the electronic document posted in the message exchange service comprising: select a thread on the service screen, select a file from a list of file names, select, from a list of options, an option to post the updated version of the electronic document in the thread, and present a button to execute the posting of the updated version in a predetermined location of the thread.

* * * * *